(12) United States Patent
Takayasu et al.

(10) Patent No.: US 8,597,603 B2
(45) Date of Patent: Dec. 3, 2013

(54) DECOMPOSITION/ELIMINATION METHOD USING A PHOTOCATALYTIC MATERIAL

(75) Inventors: Teruki Takayasu, Ikoma (JP); Teruo Arai, Ikoma (JP); Kinji Onoda, Ikoma (JP)

(73) Assignee: Showa Co., Ltd., Ikoma (JP)

( * ) Notice: Subject to any disclaimer, the term of this patent is extended or adjusted under 35 U.S.C. 154(b) by 0 days.

(21) Appl. No.: 13/701,920

(22) PCT Filed: May 30, 2011

(86) PCT No.: PCT/JP2011/062337
§ 371 (c)(1),
(2), (4) Date: Dec. 4, 2012

(87) PCT Pub. No.: WO2011/152338
PCT Pub. Date: Dec. 8, 2011

(65) Prior Publication Data
US 2013/0078174 A1    Mar. 28, 2013

(30) Foreign Application Priority Data

Jun. 4, 2010  (JP) ................................. 2010-128977
Dec. 3, 2010  (JP) ................................. 2010-269960

(51) Int. Cl.
*B01D 53/50*    (2006.01)
*B01D 53/56*    (2006.01)
*B01J 37/34*    (2006.01)

(52) U.S. Cl.
USPC . 423/210; 423/235; 423/243.01; 423/243.02; 423/522; 423/523; 502/5; 502/522

(58) Field of Classification Search
USPC .............. 423/210, 235, 243.01, 243.02, 522, 423/523; 502/5, 522
See application file for complete search history.

(56) References Cited

U.S. PATENT DOCUMENTS

| | | | | |
|---|---|---|---|---|
| 4,861,484 A | * | 8/1989 | Lichtin et al. | 210/638 |
| 7,335,620 B2 | * | 2/2008 | Ito et al. | 502/208 |
| 7,795,173 B2 | * | 9/2010 | Vanderspurt et al. | 502/350 |
| 8,178,065 B2 | * | 5/2012 | Al-Zeghayer et al. | 423/245.1 |
| 2013/0078174 A1 | * | 3/2013 | Takayasu et al. | 423/243.02 |

FOREIGN PATENT DOCUMENTS

| | | |
|---|---|---|
| GB | 1464050 A | 2/1977 |
| JP | 50-152980 A | 12/1975 |
| JP | 06-142440 A | 5/1994 |
| JP | 2000-070968 A | 3/2000 |
| JP | 2000-117271 A | 4/2000 |
| JP | 2005-082674 A | 3/2005 |
| JP | 2005-240139 A | 9/2005 |
| JP | 2005-288302 A | 10/2005 |
| JP | 2006-035140 A | 2/2006 |
| JP | 2010-022958 A | 2/2010 |

OTHER PUBLICATIONS

International Search Report dated Aug. 30, 2011, issued for PCT/JP2011/062337.

* cited by examiner

*Primary Examiner* — Timothy Vanoy
(74) *Attorney, Agent, or Firm* — Edwards Wildman Palmer LLP

(57) ABSTRACT

The present invention provides a new method for decomposing and/or removing hazardous substances using a photocatalytic material. The method of the present invention is sufficiently useful in fields requiring quick decomposition and/or removal of hazardous substances in gas and/or liquid phases. The decomposition method of the present invention using a photocatalytic material enables significantly efficient and rapid decomposition of hazardous substances in gas and/or liquid phases by causing a photocatalytic material to coexist with a dilute hydrogen peroxide solution.

7 Claims, 2 Drawing Sheets

DECOMPOSITION/ELIMINATION METHOD USING A PHOTOCATALYTIC MATERIAL

TECHNICAL FIELD

The present invention relates to a decomposition and/or removal method for decomposing hazardous substances in gas and/or liquid phases using a photocatalytic material.

BACKGROUND ART

Titanium oxide photocatalytic materials, which are capable of decomposing hazardous substances in the atmosphere or water simply by being irradiated with light, are attracting worldwide attention, and are expected to be applied to various fields.

Titanium oxides have rutile, anatase, and like crystal structures. Of these, anatase-type titanium oxide is known for its high photocatalytic characteristic.

Most titanium oxide photocatalysts are in the form of fine particles with a diameter of several nanometers to several tens of nanometers so as to ensure a sufficient surface area. To prepare a practical photocatalytic material, the titanium oxide photocatalysts are applied onto a base substrate to form a coating layer using a binder component.

In this method using a binder, most of the titanium oxide fine particles are immersed in the binder, leaving only a trace amount of titanium oxide exposed to the surface. Thus, a trace amount of titanium oxide is conducive to the actual reaction, and the photocatalytic activity inevitably decreases.

In order to obtain a photocatalytic material that is suitable for industrial production and that ensures formation of a sufficient amount of anatase-type titanium oxide, the inventors of the present invention previously invented a method of forming a titanium nitride on a surface of a titanium metal or a titanium alloy, and subjecting the metal or the alloy to anodization (Japanese Unexamined Patent Application Publication No. 2005-240139).

However, although this invention succeeded in improving the activity of a photocatalytic material compared with those of hitherto-known photocatalytic materials, its effect was still insufficient in fields requiring quick decomposition of hazardous substances in gas or liquid phases.

On the other hand, Japanese Unexamined Patent Application Publication No. H06-142440 discloses a hazardous substance decomposition and/or removal technique that relies on the oxidization properties of hydrogen peroxides. In this technique, 0.1 to 10 weight %, more preferably 1 to 5 weight % of hydrogen peroxide, alkali content hydrogen peroxide, or the like is incorporated in a breathable porous body, such as silica gels, zeolite, or activated carbon, thereby oxidizing hazardous gas due to the oxidization properties of the hydrogen peroxide. However, because this method performs decomposition and/or removal by relying only on the oxidization properties of hydrogen peroxide, it is necessary to use highly concentrated hydrogen peroxide, which harms the environment with its strong toxicity and corrosive properties.

In addition, there has been research into a technique for decomposing and/or removing hazardous substances by causing a photocatalyst to coexist with hydrogen peroxide.

Japanese Unexamined Patent Application Publication No. 2000-70968 discloses a technique for decomposing and/or removing hazardous substances by using a photocatalyst obtained by a hitherto-known coating method, ozone, and hydrogen peroxide. However, in this technique, if only hydrogen peroxide is added, without adding ozone, the decomposition and/or removal effect of the photocatalyst is insufficient; therefore, using both ozone and hydrogen peroxide with a photocatalyst is indispensable in this method.

Further, Japanese Unexamined Patent Application Publication No. 2006-35140 discloses a technique for removing contaminants in water such as fenitrothion by irradiating the water with an ultrasonic wave at a frequency of 28 to 45 kHz, as well as using photocatalytic particles and hydrogen peroxide.

Additionally, Japanese Unexamined Patent Application Publication No. 2010-22958 discloses a technique for decomposing persistent agricultural chemical components using a photocatalyst. In this technique, contaminants are decomposed and/or removed by using 10 ppm to 50 ppm of ozone, 5 ppm to 30 ppm of oxygen, and 200 ppm to 2500 ppm of hydrogen peroxide, after adjusting the pH to 6 or more.

The large amount of sulfur oxides, nitrogen oxides, etc., generated by the combustion of fossil fuel in coal-fired plants or the like has always been problematic. These hazardous substances in gas phases cause acid rain. As a method for removing sulfur oxides, a method of reacting a limewater slurry with a sulfur oxide gas, and removing the resulting calcium sulfates has often been used. As a method for removing nitrogen oxides, ammonia catalytic reduction, which reduces nitrogen oxides using ammonia, has been often used.

As explained above, although various photocatalysis technologies using a combination of a photocatalyst and hydrogen peroxide have been published, none of those technologies ensure a sufficient effect by combining only hydrogen peroxide and a photocatalyst, unless using ozone, ultrasonic wave, or the like together with hydrogen peroxide and a photocatalyst.

Further, the limewater slurry method and the ammonia catalytic reduction for removing a large amount of sulfur oxides, nitrogen oxides, etc., resulting from the combustion of fossil fuel in coal-fired plants or the like also have drawbacks such as high cost, and the toxicity of ammonia.

CITATION LIST

Patent Document

Patent Document 1: Japanese Unexamined Patent Application Publication No. 2005-240139
Patent Document 2: Japanese Unexamined Patent Application Publication No. H06-142440
Patent Document 3: Japanese Unexamined Patent Application Publication No. 2000-70968
Patent Document 4: Japanese Unexamined Patent Application Publication No. 2006-35140
Patent Document 5: Japanese Unexamined Patent Application Publication No. 2010-22958

SUMMARY OF INVENTION

Technical Problem

Accordingly, an object of the present invention is to provide a new method for decomposing and/or removing hazardous substances using a photocatalytic material. The method of the present invention is sufficiently useful in fields requiring quick decomposition and/or removal of hazardous substances in gas and/or liquid phases.

Another object of the present invention is to provide a new method for efficiently removing a large amount of sulfur oxides, nitrogen oxides, etc., resulting from the combustion of fossil fuel in coal-fired plants or the like.

Solution to Problem

The inventors of the present invention conducted extensive research to attain the above objects, and found a technique in which decomposition is performed in the presence of a photocatalytic material and an environmentally friendly dilute hydrogen peroxide solution. This technique is sufficiently useful in fields requiring quick decomposition of hazardous substances in gas and/or liquid phases.

Further, the inventors also found that the above technique is also useful for flue-gas desulfurization and denitration technology in fossil fuel combustion plants, such as coal-fired plants, which generate a large amount of highly concentrated nitrogen or sulfur oxides in gas phases. More specifically, the inventors found a method of, in a primary device for selectively removing highly concentrated nitrogen oxides, removing the nitrogen oxides by coexisting them with a water-diluted solution of an amine compound, specifically, at least one member of amine compounds selected from the group consisting of triethanolamine, methylamine, morpholine or the like; and then in a secondary device, causing a photocatalyst to coexist with dilute hydrogen peroxide. In this manner, the method simultaneously treats a large amount of acid rain-causing hazardous nitrogen oxides, sulfur oxides, and the like generated in coal-fired plants, efficiently and at a low cost.

The inventors also found that it is preferable to use a photocatalyst containing a large amount of crystalline titanium oxide, in particular, a photocatalyst containing an anatase-type titanium oxide having a high photocatalytic activity on its surface as the photocatalytic material. The photocatalyst can be obtained by forming a titanium nitride on a titanium metal or a titanium alloy surface, followed by anodization.

The present invention was completed based on these findings.

Specifically, the present invention provides the decomposition techniques defined below that make it possible to quickly decompose hazardous substances in gas and/or liquid phases.

Item 1: A decomposition and/or removal method using a photocatalytic material, the method performing significantly efficient and rapid decomposition of hazardous substances in gas and/or liquid phases in the presence of a photocatalytic material and a dilute hydrogen peroxide solution.

Item 2: The decomposition and/or removal method using a photocatalytic material according to Item 1, wherein the photocatalytic material is a photocatalytic material having a crystalline titanium oxide film, obtained by forming a titanium nitride on a surface of a titanium metal or a titanium alloy, and anodizing the titanium metal or titanium alloy with a surface on which a titanium nitride is formed.

Item 3: The decomposition and/or removal method using a photocatalytic material according to Item 2, wherein the crystalline titanium oxide is an anatase-type titanium oxide.

Item 4: The decomposition and/or removal method using a photocatalytic material according to Item 1, 2 or 3, wherein the dilute hydrogen peroxide solution has a hydrogen peroxide concentration of 1 weight % (10000 ppmW) or less.

Item 5: A method of removing a gaseous hazardous substance containing a highly concentrated nitrogen oxides and sulfur oxides in an environment containing the hazardous substance, the method comprising: (1) removing nitrogen oxides by using an amine compound aqueous solution as a chemical for removing nitrogen oxides in a primary device and (2) removing sulfur oxides by using the decomposition method of Item 1 in which the photocatalytic material and the dilute hydrogen peroxide solution are present in a secondary device.

Item 6: The method according to Item 5, wherein the amine compound is at least one member selected from the group consisting of triethanolamine, methylamine and morpholine.

Item 7: The method according to Item 5 or 6, wherein the method produces a sulfuric acid from a sulfur oxide that is a hazardous substance in a gas phase.

DESCRIPTION OF EMBODIMENTS

The present invention is more specifically described below.

(1) Photocatalytic Material

As the photocatalytic material of the present invention, it is preferable to use a titanium oxide having high activity and stability. When irradiated with near-ultraviolet of 400 nm or less, a titanium oxide photocatalyst generates positive holes in the valence band while generating electrons in the conduction band, thereby causing an oxidation-reduction reaction.

As a result of an oxidation-reduction reaction, active oxygen species such as OH radicals are generated. It is known that this active oxygen oxidatively decomposes organic substances and/or inorganic substances in gas and/or liquid phases.

In particular, because the energy level of the conduction band in an anatase-type titanium oxide is higher than that of a rutile-type, the electrons excited to the conduction band are efficiently conducive to reaction. Accordingly, the photocatalytic activity of an anatase-type titanium oxide is considered to be higher than that of a rutile-type.

However, in the hitherto-known photocatalytic technologies using fine particles of titanium oxides, the titanium oxide particles are mixed with a binder to be applied to various base materials as a coating layer. In this method, a trace amount of titanium oxide is exposed to the surface, thereby significantly decreasing the photocatalytic activity.

The inventors of the present invention previously succeeded in producing a photocatalytic material having high activity using a method of forming a titanium nitride on a titanium metal surface, for example, by heating a titanium metal in a nitrogen gas, followed by anodization, thereby causing a chemical change in a titanium metal surface and efficiently forming an anatase type titanium oxide film having high photocatalytic activity on the surface. However, this technique was not sufficiently effective as an industrial process to quickly decompose hazardous substances in gas and/or liquid phases.

Therefore, the inventors conducted extensive research, and found that decomposition efficiency significantly increases by using a photocatalytic material having high activity produced by a method of forming a titanium nitride on a titanium metal surface by, for example, heating a titanium metal in a nitrogen gas, followed by anodization, in the presence of a dilute hydrogen peroxide solution of 1 weight % (10000 ppmW) or less.

Further, the inventors also found that a large amount of sulfur oxides, nitrogen oxides, etc., generated during fossil fuel combustion in coal-fired plants or the like can be efficiently and simultaneously removed at low coat, while generating industrially profitable sulfuric acids, by using a primary device that uses an aqueous solution of an amine compound as a chemical for removing nitrogen oxides; and a secondary device that uses a photocatalytic material having high activity, which is produced by forming a titanium nitride on a titanium metal surface, followed by anodization, in the presence of a dilute hydrogen peroxide solution.

In the technique of removing hazardous substances in liquid and/or gas phases by causing a photocatalytic material to coexist with a dilute hydrogen peroxide, the hydrogen peroxide preferably has a concentration of not less than 0.1 ppmW and not more than 10000 ppmW; more preferably, in a range of 10 ppmW to 1000 ppmW. By using hydrogen peroxide in this concentration range, the decomposition efficiency significantly increases.

Further, a large amount of sulfur oxides, nitrogen oxides, etc., generated during fossil fuel combustion in coal-fired plants or the like was also efficiently removed by first removing nitrogen oxide in the primary device using a shower or spray of an amine compound aqueous solution serving as a chemical for removing nitrogen oxides; namely, an aqueous solution of 10 weight % or less of at least one member of amine compounds selected from the group consisting of triethanolamine, methylamine and morpholine; and then treating the resulting substance in the presence of a photocatalytic material and a dilute hydrogen peroxide in the secondary device.

Hereunder, a method for producing an anatase-type titanium oxide film of a crystalline titanium oxide by way of electrolytic anodization is described. The anatase-type titanium oxide film is used in the decomposition method of the present invention using a photocatalytic material.

The method for producing an anatase-type titanium oxide film is characterized by including Step (i) and Step (ii) below.

Step (i) of forming a titanium nitride on a titanium or titanium alloy surface; and Step (ii) of immersing the titanium or titanium alloy resulting from Step (i) in an electrolyte solution containing at least one acid selected from the group consisting of inorganic acids and organic acids having an etching property with respect to titanium, followed by anodization by controlling a current for applying a voltage equal to or greater than a spark discharging voltage.

In the above method for producing an anatase-type titanium oxide film, Step (i) of forming a titanium nitride is preferably performed using at least one method selected from the group consisting of PVD, CVD, thermal spray, heating in a nitrogen gas atmosphere, and heating in a nitrogen gas atmosphere using an oxygen-trapping agent.

In the above method for producing an anatase-type titanium oxide film, the heating in a nitrogen gas atmosphere is preferably performed by heating titanium or a titanium alloy in a nitrogen gas atmosphere.

In the above method for producing an anatase-type titanium oxide film, the electrolyte solution used in the anodization in Step (ii) preferably contains a sulfuric acid and/or a phosphoric acid.

In the above method for producing an anatase-type titanium oxide film, the electrolyte solution used in the anodization of Step (ii) preferably further contains hydrogen peroxide.

In the above method for producing an anatase-type titanium oxide film, the anodization in Step (ii) is preferably performed by controlling a current for generating a spark discharging voltage.

Hereinafter, titanium and a titanium alloy may simply be referred to as a titanium material.

In Step (i), a titanium nitride is formed on a titanium or a titanium alloy surface.

When a titanium alloy is used in the present invention, the type of titanium alloy is not particularly limited. Examples of titanium alloys include Ti-6Al-4V, Ti-0.5Pd, and the like.

In Step (i), a titanium nitride layer having a thickness of generally about 0.1 to 100 µm, preferably about 0.5 to 50 µm, further preferably about 1 to 30 µm is formed on a surface of a titanium material.

Any method can be used for the formation of a titanium nitride on the surface of a titanium material. For example, a method for physically or chemically adhering a titanium nitride to a surface of a titanium material, or a method for reacting titanium and nitrogen on a surface of a titanium material, thereby forming a titanium nitride on the surface, may be used.

Specific examples of these methods include PVD (physical vapor deposition), CVD (chemical vapor deposition), thermal spray (film coating by spray), and heating of a titanium material in a nitrogen gas atmosphere.

Examples of PVD include ion plating and sputtering.

Examples of CVD include thermal CVD, plasma CVD, and laser CVD.

Examples of thermal spray include flame spray, arc spray, plasma spray, and laser spray.

As a specific example of the heating process of a titanium material in a nitrogen gas atmosphere, a method for heating a titanium material generally at 500° C. or more, preferably at 750° C. or more, in a nitrogen gas atmosphere can be employed.

The nitrogen gas atmosphere in the heating process is not particularly limited, insofar as the atmospheric pressure of the nitrogen gas is, generally, about 0.01 to 100 MPa, preferably about 0.1 to 10 MPa, further preferably about 0.1 to 1 MPa.

The time for heating a titanium material is generally 1 to 12 hours, preferably 2 to 8 hours, further preferably 3 to 6 hours.

In Step (i), the type of titanium nitride to be formed on the titanium material surface is not particularly limited. Examples of titanium nitrides include TiN, $Ti_2N$, $\alpha$-$TiN_{0.3}$, $\eta$-$Ti_3N_{2-x}$, $\zeta$-$Ti_4N_{3-x}$ (provided that x is a value of not less than 0 and less than 3), mixtures thereof, and amorphous titanium nitrides.

Among them, TiN, $Ti_2N$, and mixtures thereof are preferable; TiN, and a mixture of TiN and $Ti_2N$ are further preferable; and TiN is particularly preferable.

In the present invention, the formation of titanium nitrides can be performed using one of the above methods, or an arbitrary combination of two or more of the above methods. Among the above methods, the method of heating a titanium material in a nitrogen gas atmosphere is preferable in terms of simplification, mass production, and production cost.

In Step (ii), anodization is performed by immersing the titanium or titanium alloy resulting from Step (i) in an electrolyte solution containing at least one acid selected from the group consisting of inorganic acids and organic acids having an etching property with respect to titanium, and applying a voltage equal to or greater than the spark discharging voltage.

The anodization in Step (ii) thus uses, as an electrolyte solution, an aqueous solution containing an inorganic acid and/or an organic acid having an etching property with respect to titanium. Examples of inorganic acids having an etching property with respect to titanium include sulfuric acids, phosphoric acids, hydrofluoric acids, hydrochloric acids, nitric acids, and aqua regia.

Examples of organic acids having an etching property with respect to titanium include oxalic acids, formic acids, citric acids, and trichloroacetic acids.

These acids may be used solely, or in an arbitrary combination of two or more of inorganic acids and/or organic acids.

A preferable example of an electrolyte solution containing two or more acids is an aqueous solution containing a sulfuric acid and a phosphoric acid.

The proportion of acid or acids in the electrolyte solution varies depending on the type of acid to be used, anodization conditions, and the like. The proportion of the total acid is generally 0.01 to 10 M, preferably 0.1 to 10 M, further preferably 1 to 10 M.

An example of an electrolyte solution containing a sulfuric acid and a phosphoric acid is an electrolyte solution containing 1 to 8 M sulfuric acid and 0.1 to 2 M phosphoric acid.

The electrolyte solution preferably further contains hydrogen peroxide, in addition to organic acids and/or inorganic acids.

By using an electrolyte solution containing hydrogen peroxide, it is possible to more efficiently form an anatase-type titanium oxide film.

The proportion of hydrogen peroxide in the electrolyte solution is not particularly limited. For example, the proportion is 0.01 to 5 M, preferably 0.01 to 1 M, further preferably 0.1 to 1M.

A preferable example of an electrolyte solution used in the anodization in Step (ii) is an aqueous solution containing 1 to 8 M sulfuric acid, 0.1 to 2 M phosphoric acid, and 0.1 to 1 M hydrogen peroxide.

By performing anodization by immersing the titanium or titanium alloy resulting from Step (i) in the electrolyte solution and applying a constant current to enable application of a voltage equal to or greater than the spark discharging voltage, an anatase-type titanium oxide film can be formed.

The current density in the anodization is at least 0.1 A/dm$^2$, and more preferably 1 A/dm$^2$ to 10 A/dm$^2$ in terms of cost, simplification, and performance.

The above production method enables formation of a coating film containing a large amount of anatase-type titanium oxide having high photocatalytic activity.

(2) Dilute Hydrogen Peroxide Solution

Even alone, hydrogen peroxide has strong oxidation properties. Therefore, by using a highly concentrated hydrogen peroxide solution, it is possible to decompose hazardous substances in gas and/or liquid phases. However, highly concentrated hydrogen peroxide solutions harm the environment with their high toxicity and corrosive properties.

The inventors of the present invention found that harmful organic and/or inorganic substances in gas and/or liquid phases can be efficiently decomposed without causing an environmental burden by a method of using a photocatalytic material with high activity, which is obtained by forming a titanium nitride on a titanium metal surface, followed by anodization, in the presence of an environmentally friendly and highly safe dilute hydrogen peroxide solution having a hydrogen peroxide concentration of 1 weight % or less. With this finding, the inventors completed the present invention.

The concentration of hydrogen peroxide in the dilute hydrogen peroxide solution is preferably 0.00001 weight % to 1 weight % (0.1 ppmW to 10000 ppmW), more preferably 0.001 weight % to 0.1 weight % (10 ppmW to 1000 ppmW).

(3) Method for Decomposing Hazardous Substances

The above method is effective to decompose and/or remove various hazardous organic or inorganic substances in gas and/or liquid phases, including VOC (volatile organic compounds) such as toluene, acetaldehyde, isopropyl alcohol, or trichloroethylene; persistent organic substances such as PCB or dioxin; sulfur oxides (SOx such as $S_2O$, $SO$, $S_2O_3$, $SO_2$, $S_2O_7$, and the like) that cause acid rain; and nitrogen oxides (NOx such as $NO$, $NO_2$, and the like) that cause air pollution.

(3-1) Method for Removing by Decomposing Hazardous Substances in Liquid Phases

Specifically, the decomposition and/or removal of hazardous substances in a liquid phase is performed as follows. A photocatalytic material having high activity, obtained by forming a titanium nitride on a titanium metal surface, followed by anodization, is placed in a solution obtained by adding a hydrogen peroxide solution to a solution containing a hazardous substance in a liquid phase. With the photocatalytic material placed therein, the solution is irradiated with a ray of 400 nm or less, thereby conducting a decomposition treatment.

(3-2) Method for Removing by Decomposing Hazardous Substances in Gas Phases

Decomposition and/or removal of gaseous hazardous substances in a gas phase is performed as follows. A gas flow system or the like containing the target hazardous gas is constructed, and a photocatalytic material having high activity, obtained by forming a titanium nitride on a titanium metal surface, followed by anodization, is placed in the system into which a shower or spray of a dilute hydrogen peroxide solution is applied. With the photocatalytic material placed therein, the system is irradiated with a ray of 400 nm or less, thereby conducting a decomposition treatment.

(3-3) Method for Decomposing and Removing a Large Amount of Highly Concentrated Nitrogen Oxides and/or Sulfur Oxides The above decomposition and removal method can also be used to remove a large amount of sulfur oxides, nitrogen oxides, etc., generated during fossil fuel combustion in coal-fired plants or the like. Specifically, in the primary device, nitrogen oxides are removed by a shower or spray of an amine compound aqueous solution as a chemical for removing nitrogen oxides, namely, an aqueous solution of at least one compound selected from the group consisting of triethanolamine, methylamine, or morpholine; thereafter, in the secondary device, a photocatalytic material having high activity, obtained by forming a titanium nitride on a titanium metal surface, followed by anodization, is placed in a system into which a shower or spray of a dilute hydrogen peroxide solution is applied. With the photocatalytic material placed therein, the system is irradiated with a ray of 400 nm or less, thereby conducting a nitrogen oxides and/or sulfur oxides decomposition treatment.

The concentration of the amine compound applied as a shower or spray in the first device is preferably 0.01 weight % to weight %, more preferably 0.1 weight % to 10 weight %, particularly preferably 0.5 weight % to 2 weight %.

ADVANTAGEOUS EFFECTS OF INVENTION

The method of the present invention enables significantly efficient and rapid decomposition and/or removal of hazardous organic and inorganic substances in gas and/or liquid phases without causing an environmental burden, by performing the decomposition and/or removal using a photocatalytic material having high activity in the presence of an environmentally friendly and highly safe dilute hydrogen peroxide solution of 1 weight % or less. For example, a photocatalytic material can be obtained by forming a titanium nitride on a titanium metal surface, followed by anodization.

The method of the present invention also enables removal of a large amount of sulfur oxides, nitrogen oxides, etc., generated during fossil fuel combustion in coal-fired plants or the like. More specifically, nitrogen oxides are removed in the primary device by applying a shower or spray of an amine compound aqueous solution as a chemical for removing nitrogen oxides, namely, an aqueous solution of at least one compound selected from the group consisting of triethanolamine, methylamine, and morpholine; afterward, a photocatalytic material having high activity is used together with an environmentally friendly and highly safe dilute hydrogen peroxide solution of 1 weight % or less. For example, a photocatalytic material can be obtained by forming a titanium nitride on a titanium metal surface, followed by anodization. In this manner, decomposition and/or removal of large amounts of sulfur oxides and nitrogen oxides can be performed at low cost.

EMBODIMENTS

Example 1

A titanium metal was kept in a nitrogen gas atmosphere at 950° C. for an hour to form a titanium nitride on its surface. The titanium metal with a titanium nitride layer thereon was subjected to anodization for 30 minutes at a current density of 4 A/dm², using an electrolyte solution of 1.5 M sulfuric acid, 0.1 M phosphoric acid, and 0.3 M hydrogen peroxide, thereby obtaining a photocatalytic material. Methylene blue (Wako Pure Chemical Ind., Ltd.) was diluted with distilled water, and an aqueous solution having an absorbance of 1.000 at 660 nm was prepared using a spectrophotometer (UV mini 1240: product of Shimadzu Corp.).

A 50 mm×50 mm square of a photocatalytic material was placed in the aqueous solution, and a quartz plate lid was placed thereon. The solution was irradiated with fluorescent light (black light: Toshiba Lighting & Technology Corp.) that emits near-ultraviolet of 400 nm or less. Here, light intensity was adjusted to 1.0 mW/cm².

Figure 1:
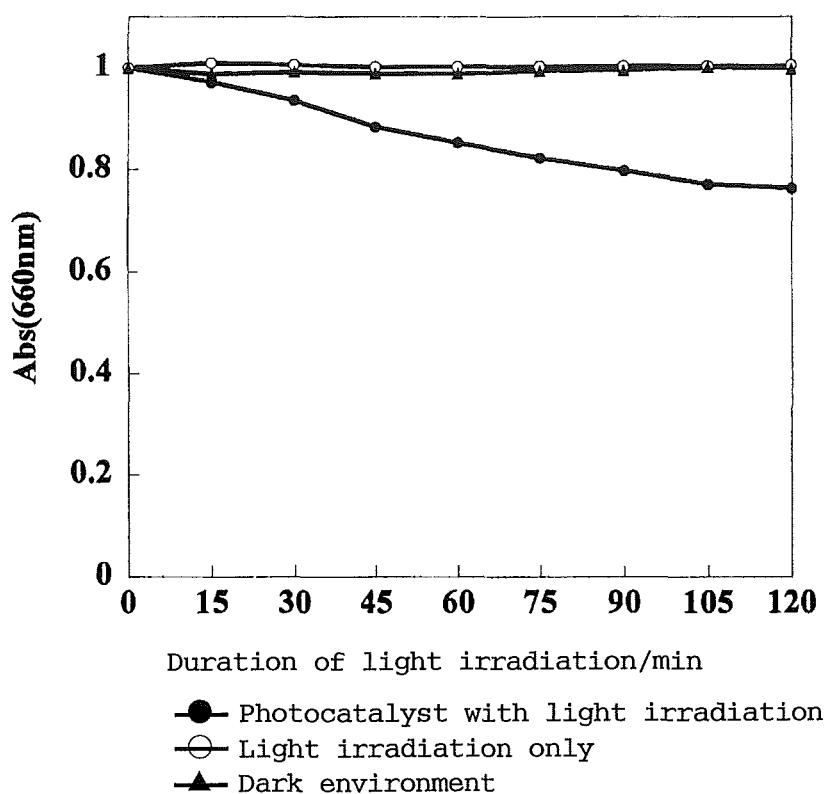
FIG. 1: Decomposability of methylene blue in a system with no hydrogen peroxide
Figure 2:
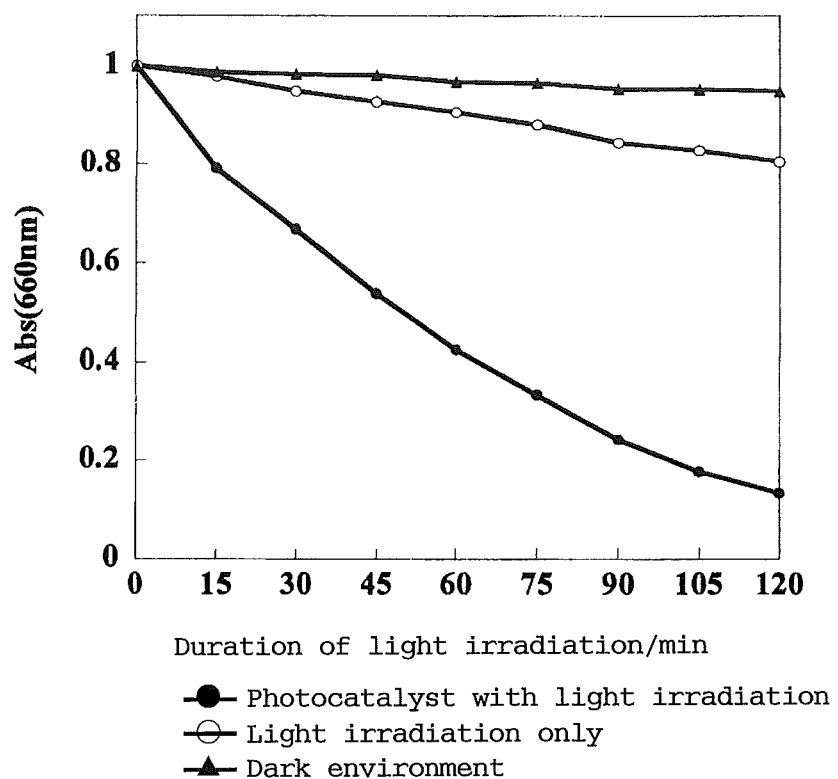
FIG. 2: Decomposability of methylene blue in a system with 0.001 weight % (10 ppmW) of hydrogen peroxide

FIG. 1 shows an example in which hydrogen peroxide was not added. FIG. 2 shows an example in which a solution containing hydrogen peroxide at a concentration of 0.001 weight % (10 ppmw) was added.

A comparison of the results in FIGS. 1 and 2 found that the photocatalytic activity was significantly increased by the addition of dilute (10 ppmw) hydrogen peroxide.

Example 2

A titanium metal was kept in a nitrogen gas atmosphere at 950° C. for an hour to form a titanium nitride on its surface. The titanium metal with a titanium nitride layer thereon was subjected to anodization for 30 minutes at a current density of 4 A/dm², using an electrolyte solution of 1.5 M sulfuric acid, 0.1 M phosphoric acid, and 0.3 M hydrogen peroxide, thereby obtaining a photocatalytic material.

Using this photocatalytic material, an experiment was performed in a flow system of a sulfur dioxide that causes acid rain.

A sulfur dioxide standard gas (Sumitomo Seika Chemicals Co., Ltd., concentration=15%) was diluted with air, thereby preparing a 500 ppmV sulfur dioxide gas.

Next, a photocatalytic material having high activity, obtained by forming a titanium nitride on a titanium metal surface, followed by anodization, was placed in a device of 300 mm in width, 400 mm in height, and 1000 mm in depth (inner volume=120 L) in a manner such that the gross area of the photocatalytic material was 1 m². The device was ventilated with a sulfur dioxide gas prepared as above, followed by light irradiation using fluorescent light (black light: Toshiba Lighting & Technology Corp.) that emits near-ultraviolet of 400 nm or less (light intensity=2.2 mW/cm²). The sulfur dioxide gas concentrations before and after the gas ventilation were measured using an exhaust gas analyzer (testo 335: product of Testo Corp.).

Table 1 shows results of experiments in which $SO_2$ flow rates were 1, 5, and 10 L/min, and the spray amounts of 0.1 weight % (1000 ppmW) hydrogen peroxide were 0.05, 0.10, and 0.20 L/min.

The results show that, in all cases, the effect was significantly increased by adding hydrogen peroxide.

TABLE 1

| | Hydrogen Peroxide | | | | | |
|---|---|---|---|---|---|---|
| | Added | Not added | Added | Not added | Added | Not added |
| Flow rate of $SO_2$ gas (L/min) | 10 | | 5 | | 1 | |
| Amount of $H_2O_2$ spray (L/min) | 0.20 | — | 0.10 | — | 0.05 | — |
| Initial $SO_2$ gas concentration (ppmV) | 497 | 504 | 487 | 479 | 495 | 509 |
| Final $SO_2$ gas concentration (ppmV) | 49 | 379 | 0 | 222 | 0 | 117 |

Example 3

A titanium metal was kept in a nitrogen gas atmosphere at 950° C. for an hour to form a titanium nitride on its surface. The titanium metal with a titanium nitride layer thereon was subjected to anodization for 30 minutes at a current density of 4 A/dm², using an electrolyte solution of 1.5 M sulfuric acid, 0.1 M phosphoric acid, and 0.3 M hydrogen peroxide, thereby obtaining a photocatalytic material.

Using the photocatalytic material, an experiment was performed in a flow system of a sulfur dioxide and a nitrogen oxide that cause acid rain.

A nitric oxide standard gas (Sumitomo Seika Chemicals Co., Ltd., concentration=10%) as a nitrogen oxide, and a sulfur dioxide standard gas, (Sumitomo Seika Chemicals Co., Ltd., concentration=15%) as a sulfur oxide were separately diluted with air, thereby preparing a nitrogen oxide gas of 522 ppmV and a sulfur oxide gas of 2690 ppmV. With the assumption that the gas temperature is high during fossil fuel combustion in coal-fired plants, the mixed gas was heated to 80° C. using a hot-air generator, and supplied at a flow rate of 3 m³/min.

First, a primary device was ventilated with the mixed gas of the nitrogen oxide gas and the sulfur oxide gas. The primary device had a cylindrical shape with a diameter of 400 mm and a height of 800 mm (inner volume=100 L), filled with tricalnet packing (Takiron Co., Ltd.) as a filler. A shower of 50 L of 0.5 weight % triethanolamine aqueous solution was applied in the primary device at a flow rate of 180 L/min.

Next, a secondary device was ventilated with the mixed gas having passed through the primary device. The secondary device was 300 mm in width, 400 mm in height, and 1000 mm in depth (inner volume=120 L), and contained a photocatalytic material having high activity obtained by forming a titanium nitride on a titanium metal surface, followed by anodization. The photocatalytic material was set so that that the gross area thereof was 1 m². The secondary device was irradiated with fluorescent light (black light: Toshiba Lighting & Technology Corp.) that emits near-ultraviolet of 400 nm (light intensity=2.2 mW/cm$^2$), while applying a shower of 270 L of 0.1 weight % hydrogen peroxide at a flow rate of 90 L/min.

The concentrations of the nitrogen oxide gas and the sulfur oxide gas before being supplied to the primary device (before treatment), and the concentrations of the nitrogen oxide gas and the sulfur oxide gas after being supplied to the primary and secondary devices (after treatment) were measured using an exhaust gas analyzer (testo 335: product of Testo Corp.).

Table 2 shows the results. The results showed highly efficient removal of nitrogen oxide and sulfur oxide.

TABLE 2

| Type of gas | Concentration (ppmV) | | Removal Rate (%) |
| --- | --- | --- | --- |
| | Before Treatment | After Treatment | |
| Nitrogen oxide | 522 | 58 | 88.9 |
| Sulfur oxide | 2690 | 217 | 91.9 |

Table 3 shows the sulfite ion concentrations (ppmW) and the sulfate ion concentrations (ppmW) of a waste fluid from the first device (primary device) and a waste fluid from the second device (secondary device), and a mixed waste fluid of the waste fluids from the first and second devices.

Although sulfite ion derived from a sulfur oxide is unstable, it was confirmed that sulfite ion was present in the waste fluid from the first device because of the reducing property of triethanolamine in the first device.

It was found that, by mixing the waste fluids from the first devices with the waste fluids from the second devices, sulfite ion disappeared, and sulfate ion was generated.

TABLE 3

| Type of ion | Concentration (ppmV) | | |
| --- | --- | --- | --- |
| | First device | Second device | Mixed fluid |
| Sulfite ion | 70.7 | 0 | 0 |
| Sulfate ion | 212.2 | 543.4 | 468.1 |

The invention claimed is:

1. A method of removing a gaseous hazardous substance containing a highly concentrated nitrogen oxides and sulfur oxides in an environment containing the hazardous substance, the method comprising: (1) removing nitrogen oxides by using an amine compound aqueous solution as a chemical for removing nitrogen oxides in a primary device and (2) removing sulfur oxides by using a decomposition method in which a photocatalytic material and a dilute hydrogen peroxide solution are present in a secondary device.

2. The method according to claim 1, wherein the amine compound is at least one member selected from the group consisting of triethanolamine, methylamine and morpholine.

3. The method according to claim 2, wherein the method produces a sulfuric acid from a sulfur oxide that is a hazardous substance in a gas phase.

4. The method according to claim 1, wherein the method produces a sulfuric acid from a sulfur oxide that is a hazardous substance in a gas phase.

5. The method according to claim 1, wherein the photocatalytic material is a photocatalytic material having a crystalline titanium oxide film, obtained by forming a titanium nitride on a surface of a titanium metal or a titanium alloy, and anodizing the titanium metal or titanium alloy with a surface on which a titanium nitride is formed.

6. The method according to claim 5, wherein the crystalline titanium oxide is an anatase-type titanium oxide.

7. The method according to claim 1, wherein the dilute hydrogen peroxide solution has a hydrogen peroxide concentration of 1 weight % or less.

* * * * *